Sept. 22, 1959 T. C. DELKER ET AL 2,905,505
CASTERED DUAL WHEEL ASSEMBLY
Filed Dec. 31, 1953
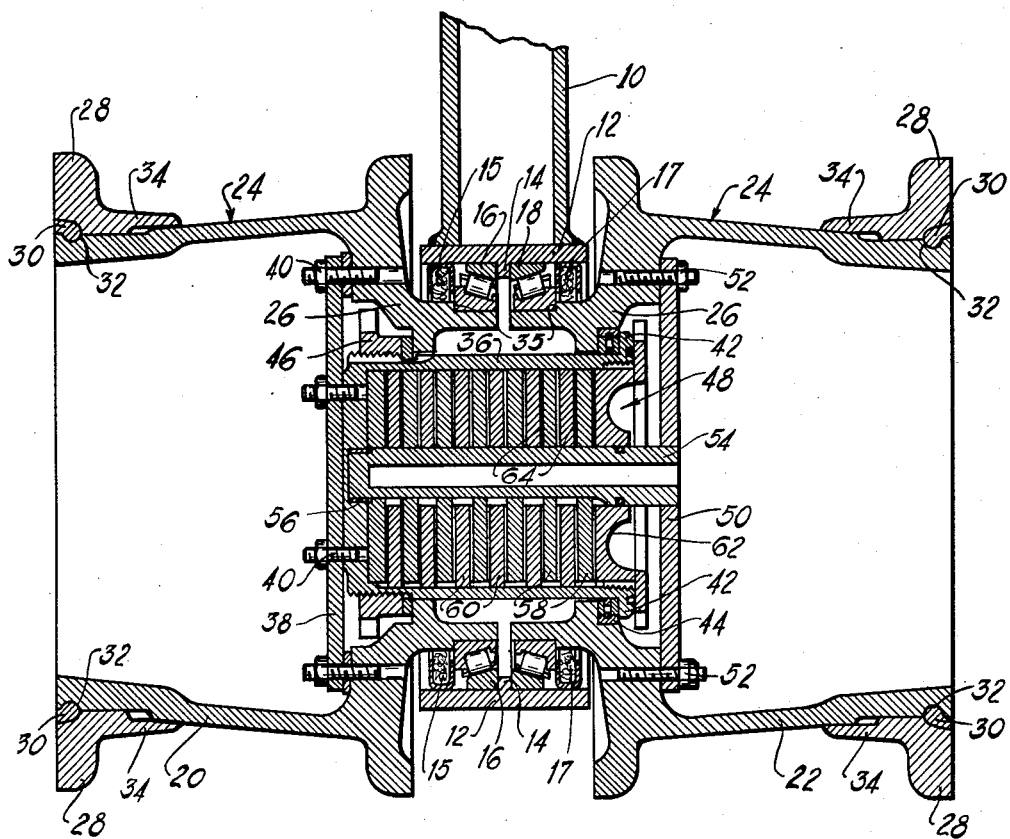
INVENTORS
THOMAS C. DELKER
BY WILLIAM J. EATON
Thomas H. Murray
AGENT

United States Patent Office 2,905,505
Patented Sept. 22, 1959

2,905,505

CASTERED DUAL WHEEL ASSEMBLY

Thomas C. Delker and William J. Eaton, South Bend, Ind., assignors to Bendix Aviation Corporation, South Bend, Ind., a corporation of Delaware Application December 31, 1953, Serial No. 401,643

12 Claims. (Cl. 301—36)

This invention relates to a castered dual wheel assembly for aircraft and more particularly to a castered dual wheel assembly employing independently rotatable wheels in combination with a shimmy damper.

It is a well-known practice to caster or pivot the nose wheel of a tricycle aircraft landing gear about an axis which is inclined forward at a small angle to the vertical. A wheel of this sort is known to be torsionally unstable and has an undesirable tendency to shimmy or oscillate about its castering axis upon movement over ground surfaces. In an effort to combat this tendency certain special wheel arrangements have heretofore been employed. For example, co-rotating dual wheels have been used to stabilize the strut. Although effective for stabilization purposes, co-rotating dual wheels in the nose position make ground steering difficult and cause the tires to scrape or scrub on the ground whenever the wheels change their direction of movement. Other special wheel arrangements heretofore employed have proved to be lacking in effectiveness or simplicity.

As will become apparent from the following description, we have provided a dual wheel assembly which is: (1) torsionally stable as it passes over ground surfaces, (2) unimpaired in ground steering, and (3) simple and lightweight in construction. Briefly, this result is accomplished by employing a pair of independently rotatable dual wheels which prevent tire scrubbing in combination with a shimmy damping device which prevents the aforesaid wheel oscillation. The wheels of the present invention are carried on bearings which are disposed outside the wheel rims in contrast to the conventional wheel which employs centrally disposed bearings. It will be seen that by this method of construction the shimmy damping device can be conveniently carried within the dual wheel configuration thereby providing a simple, compact assembly.

Another object of the invention lies in the provision of a viscous type shimmy damper which utilizes the relationship of the velocity of a moving surface to fluid resistance in arresting shimmy.

The above and other objects and features of the invention will become apparent from the following description taken in connection with the accompanying drawing wherein the single figure illustrates the subject matter of the invention in cross-section.

Referring to the drawing, the lower or inner cylinder 10 of a telescoping shock strut is shown as having an annular bearing housing 12 welded or otherwise suitably secured to its lower extremity. Cylinder 10 is carried within an outer cylinder of the shock strut, not shown, to thereby facilitate rotation of the inner cylinder about its axis. Journaled within housing 12 and on each side of annular rib 14 are a pair of tapered roller bearings 16 and 18, each of which has an associated annular oil seal 15 and 17 respectively. A pair of wheels 20 and 22 are rotatably carried on said bearings. Each wheel comprises a large diameter outer rim 24 and a reduced diameter section 26 on its axial inboard side formed for insertion into the inner race of one of bearings 16 or 18. The outer flanges of the wheels are demountable to facilitate application and removal of a tire and comprise an annular tire retaining flange 28 and a flange retaining ring 30. Ring 30 is split at one point in its circumference in order that it may be snapped into annular groove 32 after flange 28 is slipped onto rim 24. In its assembled position, the lip or bead of the tire will lie on extension 34 of flange 28.

In order to hold annular shoulder 35 of each wheel in abutment with its respective bearing, a cylindrical fastening element 36 is provided. Element 36 is carried for rotational movement on wheel 20 by plate 38 and a series of fastening members 40. At the opposite end of element 36 is a radial flange 42. A roller thrust bearing 44 is carried between flange 42 and the reduced diameter section 26 of wheel 22 to thereby permit relative rotation of the wheels with respect to each other. Retaining nut 46 is threadedly received on the left end of element 36 to draw flange 42 snugly against bearing 44.

Note that in the construction shown support for the wheel rim comes from the side in cantilever fashion rather than from the axle as it does in a conventional wheel. Thus, a central axle becomes unnecessary, and the hub and spoke sections of the wheels can be eliminated. The taper on bearings 16 and 18 is such that the forces on the wheels tending to produce a moment which will force the upper portion of the wheel inward against its associated bearing are minimized, the greater part of the forces being taken along a line perpendicular to the roller axis. Axial outward thrusts on the bottom portions of the wheels due to the aforesaid cantilever loading will be taken by thrust bearing 44.

Due to the well-known inherent instability in a castered wheel arrangement, cylinder 10 and wheels 20 and 22 will oscillate or shimmy about the cylinder axis upon movement of the wheels over the ground surface. This oscillation will cause a resultant high frequency, differential rotation in the wheels. In order to prevent or damp the differential rotation and coincident oscillation of the wheels, a shimmy damper assembly, generally indicated at 48, is mounted within the dual wheel assembly. The axis of the shimmy damper assembly 48 and the axis of the cylinder 10 lie in a common plane at right angles to each other.

The damper assembly includes a plate 50 which is bolted to wheel 22 by bolts 52 and an axially extending shaft or torque-taking member 54. One end of member 54 is secured to plate 50 and the other end is rotatably carried within a bearing 56 which is fitted into one end of the cylindrical fastening element 36. Member 54 is splined to receive a first stack of disc-like elements 58 which are rotatable with wheel 22; and element 36 is internally splined to receive a second stack of disc-like elements 60 which are interleaved with elements 58 and rotatable with wheel 20. An end cap 62 is threadedly received on the right end of element 36 to form a closed cylinder chamber 64 within which the disc-like elements are carried. The cylinder chamber contains a high viscosity fluid which occupies the spaces between the respective stacks of disc-like elements.

It will be noted that as long as wheels 20 and 22 rotate at the same velocity there will be no relative rotation between the respective stacks of disc-like elements. However, when the wheels begin to oscillate, the aforesaid high frequency differential rotation of the wheels and their associated stacks will result. This oscillation will be damped and finally stopped by the high resistance offered to the stacks by the fluid in chamber 64. Since the resistance offered to a moving surface in a fluid of a given viscosity is proportional to the velocity of the surface, a viscosity can be chosen which will offer high resistance to high frequency differential rotation and low resistance to gradual rotation. Thus, when the wheels turn on the ground so that one wheel must travel a greater distance than the other, the resultant gradual relative rotation of the wheels and stacks will not be appreciably restricted. The wheels will, therefore, turn on the ground without scraping.

Although only one embodiment of our invention has been shown and described in detail, it is to be understood that various changes in number and arrangement of parts can be made to suit requirements.

Having thus described our invention, what we claim as new and desire to secure by Letters Patent is:

1. A dual wheel assembly for use with a swiveled aircraft shock strut comprising a circular bearing housing carried at the lower extremity of said strut, a pair of independent bearings carried within said housing and tapered so as to take axial inward thrusts, a wheel rotatably mounted on each of said bearings, said wheel comprising an outer rim portion having a reduced diameter section at one side formed for abutment with the inner periphery of its associated bearing, a tubular member fastened to one of said wheels and carried within said reduced diameter sections for drawing said wheels together in abutment with their respective bearings to thereby lock the wheels against axial movement, said tubular member having a radial flange at each end in adjacent relationship with one of said reduced diameter sections, a bearing interposed between one of said flanges and the reduced diameter section of the other of said wheels to allow differential rotation of the wheels, and means carried within said tubular member for damping high frequency differential rotation of the wheels, said means comprising a centrally disposed torque-taking member fastened to said other wheel and extending through said tubular member, a first stack of axially spaced co-axially disposed annular members carried by said torque-taking member, a second stack of axially spaced co-axially disposed annular members carried by said tubular member in interleaving relationship with said first stack, and a high viscosity fluid carried in the space between the respective stacks which will offer high resistance to rapid differential rotation of the annular members but low resistance to gradual differential rotation.

2. A dual wheel assembly for use with a swiveled aircraft shock strut comprising a circular bearing housing carried at the lower extremity of said strut, a pair of independent bearings carried within said housing and tapered so as to take axial inward thrusts, a wheel rotatably mounted on each of said bearings, said wheel comprising an outer rim portion having a reduced diameter section at one side formed for abutment with the inner periphery of its associated bearing, means fastened to one of said wheels for drawing the wheels together in abutment with their respective bearings to thereby lock the wheels against axial movement, said means allowing differential rotation of the wheels, and means associated with said first-mentioned means for damping high frequency differential rotation of the wheels, said damping means comprising a stack of axially spaced co-axially disposed annular members carried by one of said wheels, another stack of axially spaced co-axially disposed annular members carried by the other of said wheels in interleaving relationship with said first stack, and a high viscosity fluid carried in the space between the respective stacks which will offer high resistance to rapid, intermittent differential rotation of the annular members but low resistance to gradual rotation.

3. A dual wheel and tire assembly for use with a swiveled aircraft shock strut comprising a circular bearing housing carried at the lower extremity of said strut, a pair of independent bearings carried within said housing, a wheel rotatably mounted on each of said bearings, said wheel comprising a one-piece outer rim portion having a reduced diameter section at its one side formed for abutment with the inner periphery of one of said bearings and a removable flange at its other side to facilitate removal of a tire from the rim, a fastening element carried within said reduced diameter sections for locking said wheels against axial movement, means permitting independent rotation of said wheels about their respective bearings, and means arranged between said wheels and surrounded by said housing for damping intermittent, high frequency differential rotation of the wheels, said damping means comprising a first stack of axially spaced co-axially disposed disc-like elements rotatable with one of said wheels, a second stack of axially spaced co-axially disposed disc-like elements rotatable with the other of said wheels in interleaving relation with said first stack, and a substance carried in the space between the respective stacks which will offer high resistance to rapid, intermittent different rotation of the disc-like elements but low resistance to gradual rotation.

4. A dual wheel assembly for use with a swiveled aircraft shock strut comprising a circular bearing housing carried at the lower extremity of said strut, a pair of independent bearings carried within said housing, a pair of independently rotatable wheels mounted on said bearings, means for holding said wheels against axial movement, and means disposed between said wheels and surrounded by said housing for damping intermittent, high frequency differential rotation of the wheels, said latter mentioned means comprising a first stack of axially spaced co-axially disposed disc-like elements rotatable with one of said wheels, a second stack of axially spaced co-axially disposed disc-like elements rotatable with the other of said wheels in interleaving relationship with said first stack, and a fluid carried in the space between said stacks and having a viscosity which will offer high resistance to rapid, intermittent differential rotation of the disc-like elements but low resistance to gradual differential rotation.

5. A dual wheel assembly for use with a swiveled aircraft shock strut comprising a pair of independently rotatable wheels carried at the lower extremity of said strut and damping means located between adjacent end portions of said wheels combined with each of said wheels to exert substantially equally retarding action thereon to dampen intermittent, high frequency differential rotation of the wheels, said means comprising a first stack of axially spaced co-axially disposed disc-like elements rotatable with one of said wheels, a second stack of axially spaced co-axially disposed disc-like elements rotatable with the other of said wheels in interleaving relationship with said first stack, and a fluid carried in the space between said stacks which will offer high resistance to rapid, intermittent differential rotation of the disc-like elements but low resistance to gradual differential rotation.

6. A dual hubless wheel assembly for use with a swiveled aircraft shock strut comprising a pair of independently rotatable wheels carried at the lower extremity of said strut, and means disposed between said wheels and provided at the end of said strut in line with the axis thereof for damping intermittent, high frequency differential rotation of the wheels and comprising a surface rotatable with one of said wheels, a companion surface rotatable with the other of said wheels in adjacent relationship to the surface rotatable with said one wheel, and a high viscosity fluid carried in the space between said surfaces which will damp said intermittent high frequency differential rotation but permit gradual rotation of the wheels.

7. A dual wheel assembly for use with a swiveled aircraft shock strut comprising a pair of independently rotatable hubless wheels carried at the lower extremity of said strut, and means disposed between said wheels with its axis located at right angles to and in the same plane as the axis of said strut for damping intermittent, high frequency differential rotation of the wheels and comprising a first plurality of elements rotatable with one of said wheels, a second plurality of elements rotatable with the other of said wheels in interleaving relation with said first plurality, and a high viscosity fluid carried in the space between the respective pluralities.

8. A dual wheel and tire assembly for use with a swiveled aircraft shock strut comprising a circular bearing housing carried at the lower extremity of said strut, a pair of independent bearings carried within said housing and tapered to take axial inward thrusts, a wheel rotatably mounted on each of said bearings, said wheel comprising a one piece outer rim portion having a reduced diameter section at one side formed for abutment with the inner periphery of its associated bearing, a pair of radially outwardly extending flanges carried by said rim, one of said flanges being removable to facilitate application of a tire to said rim, a tubular member fastened to one of said wheels and carried within said reduced diameter sections for drawing said wheels axially inwardly against their respective bearings, said tubular member having a radial flange at each end in adjacent relationship with one of said reduced diameter sections, and a bearing interposed between one of said flanges and the reduced diameter section of the other of said wheels to take axial outward thrusts and to allow differential rotation of the wheels.

9. A dual wheel assembly for use with a swiveled aircraft shock strut comprising a circular bearing housing carried at the lower extremity of said strut, a pair of independent bearings carried within said housing and tapered so as to take axial inward thrusts, a wheel rotatably mounted on each of said bearings, said wheel comprising an outer rim portion having a reduced diameter section at one side formed for abutment with the inner peripheral surface of its associated bearing, and means for drawing said wheels axially inwardly against their respective bearings, said means comprising a cylindrical member having its one end fastened to one of said wheels and its other end flanged, and a bearing interposed between the reduced diameter section of the other wheel and said flanged end to thereby permit independent rotation of the wheels about their respective bearings.

10. A dual wheel assembly for use with a swiveled aircraft shock strut comprising a circular bearing housing carried at the lower extremity of said strut, bearing means carried within said housing, a pair of independently rotatable wheels carried by said bearing means, and means for locking said wheels together against axial movement including coupling means passing between said wheels, and an antifriction bearing which allows relative rotational movement between turnable portions of said coupling means.

11. A dual wheel assembly comprising vertically supported bearing means, a pair of hubless, tire-supporting rims each of which is independently rotatable on the inner periphery of said bearing means and means for interlocking said wheels axially and including antifriction means permitting independent rotation of said wheels.

12. The combination with a wheel supporting structure having a bearing housing, of a pair of wheels arranged with their axes coincident, one wheel carried on each side of said housing, a pair of bearings in the housing, one for each wheel, each bearing arranged to take radial and axial thrusts, each wheel being provided with an axial extending portion of reduced diameter for receiving its associated bearing, means tieing the reduced diameter portions of said wheels together for relative rotation, and a mechanism controlling relative rotation between said wheels including interleaving elements carried by each wheel and immersed in a high viscosity fluid.

References Cited in the file of this patent

UNITED STATES PATENTS

| 2,514,137 | O'Connor | July 4, 1950 |
| 2,620,235 | Butler | Dec. 2, 1952 |
| 2,644,654 | Mercier | July 7, 1953 |

FOREIGN PATENTS

| 985,509 | France | Mar. 14, 1951 |

UNITED STATES PATENT OFFICE

CERTIFICATE OF CORRECTION

Patent No. 2,905,505 September 22, 1959

Thomas C. Delker et al.

It is hereby certified that error appears in the printed specification of the above numbered patent requiring correction and that the said Letters Patent should read as corrected below.

Column 4, line 40, after "strut" insert a comma.

Signed and sealed this 13th day of September 1960.

(SEAL)
Attest:

KARL H. AXLINE
Attesting Officer

ROBERT C. WATSON
Commissioner of Patents